United States Patent [19]
Sears

[11] 3,878,504
[45] Apr. 15, 1975

[54] DAMPED GEOPHONE

[75] Inventor: Harold A. Sears, Houston, Tex.

[73] Assignee: Hall-Sears, Inc., Houston, Tex.

[22] Filed: Sept. 21, 1973

[21] Appl. No.: 399,361

[52] U.S. Cl. ............................... 340/17; 340/8 LF
[51] Int. Cl. ............................................. G01v 1/16
[58] Field of Search ................ 340/8 LF, 11, 14, 17

[56] References Cited
UNITED STATES PATENTS

| | | | |
|---|---|---|---|
| 2,591,795 | 4/1952 | Eisler | 340/17 |
| 3,004,178 | 10/1961 | Efromson et al. | 340/8 LF |
| 3,157,852 | 12/1964 | Campbell et al. | 340/17 |
| 3,582,875 | 6/1971 | Van Wambeck et al. | 340/17 |
| 3,718,900 | 2/1973 | Holmes, Jr. | 340/17 |
| 3,738,445 | 6/1973 | Wilson et al. | 340/17 |

*Primary Examiner*—Maynard R. Wilbur
*Assistant Examiner*—T. M. Blum
*Attorney, Agent, or Firm*—Michael P. Breston

[57] ABSTRACT

A damped geophone which includes a closed housing wherein a magnet supported between a pair of pole pieces is axially supported on an upstanding post connected with a bottom closure member and defines an air gap between the magnet and the surrounding housing and a coil form having a coil wound thereon is placed in the air gap. The coil form is free to move relative to the magnet and housing. It is laterally centered at a quiescent position by upper and lower spiders formed of spring material. Its axial movement is resisted by a linear spring which in the preferred embodiment has the shape of an inverted cone formed of several helixes. A damping fluid fills the housing and submerges the coil form. The damping material prevents spurious undamped response to all excitation, principally lateral excitation. The damping fluid does not materially degrade power output of the geophone.

18 Claims, 2 Drawing Figures

3,878,504

DAMPED GEOPHONE

PRIOR ART 3,067,404    3,451,040

BACKGROUND OF THE INVENTION

In the use of geophones in seismic exploration, they are customarily placed in the field under circumstances which are less than ideal. In an ideal installation, the geophone is placed on the ground with the bottom face firmly contacted against the ground or growth on the ground. The geophone is ideally perfectly vertical to the ground and vibrations which are coupled to the geophone provide only axial exitation. Lateral exitation is undesirable in practically all circumstances and forms spurious signals. The spurious signals may come from a number of sources. For instance, the geophone may be canted at the point of contact with the earth. Gusty winds or the movement of surrounding vegetation may also cause spurious exitations.

It is with the foregoing problems and many others in mind that the geophone of the present invention has been devised. The geophone of the present invention represents a departure from current developments in geophone design. The device of the present invention utilizes fluid damping of a coil form mounted in an air gap between the surrounding housing and a permanent magnet installed axially of the coil form. The coil form is surrounded by a fluid medium having a specified viscosity. In the event of lateral exitation, the coil form is opposed in its lateral movement by the damping fluid. However, when the exitation is vertical or axial, the coil form is free to move in the air gap encountering only a small loss of power which loss of power compares more than favorably with the power losses found in critically damped geophones of the prior art.

SUMMARY OF THE INVENTION

The present invention is summarized as a damped geophone which incorporates a case or cylindrical housing which is closed at the bottom by a closure member having an upstanding central post which supports a centered magnet between a pair of pole pieces. The magnets encase and define an air gap where a coil form is laterally centered by a pair of flat disc like springs which function as mounting spiders. The spiders align the coil form in the air gap. The spiders are centered on assembly of the housing about the pole pieces and the magnet. The centered clamped spiders thus prevent canting of the coil form in the air gap relative to the magnet and housing. The coil form is wound with several turns of wire which form the output signal. An inverted conical spring of several turns partly supports the coil form at a center position of its restricted range of travel along the axis of the geophone. It provides a linear force acting on the coil form in the event of axial excursion.

An alternative embodiment fixes the coil and permits the magnet to move in an otherwise similar geophone.

DESCRIPTION OF THE PREFERRED EMBODIMENT

Figure 1:
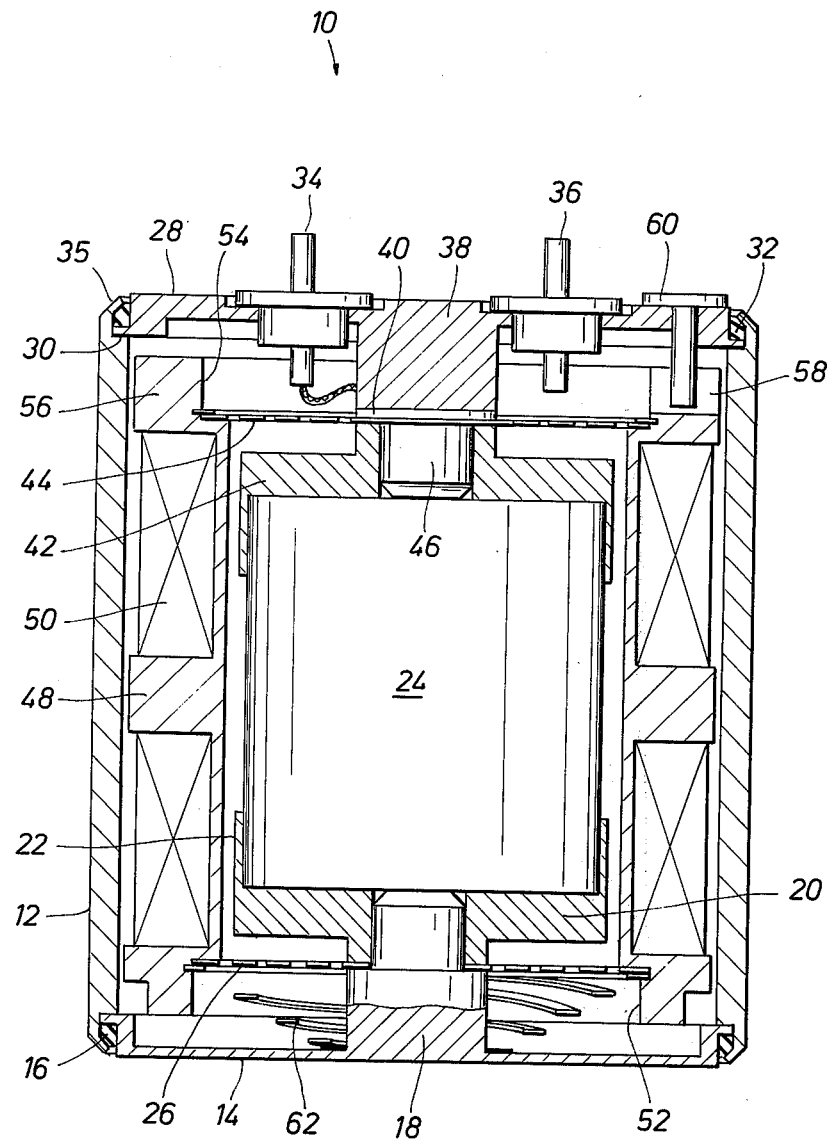
FIG. 1 is a sectional view of the geophone of the present invention taken along a diameter illustrating details of construction; and, FIG. 2 shows an alternative embodiment utilizing a different arrangement of coil and magnet.

In the single drawing, the numeral 10 identifies the geophone of the present invention. The geophone 10 is comprised of a housing which is formed of an outer cylindrical case 12. The case 12 is of right cylindrical construction. It joins to a bottom closure member 14. The closure member 14 is assembled to the cylindrical case 12 to define a fluid tight container. A seal member 16 is captured between protruding lips at the bottom of the case 12 and around the closure member 14. The lips interlock to capture the seal member 16, placing it in compression and preventing leakage from the housing.

The closure member 14 supports an upstanding post 18 which is centered and located along the axis of the housing. The post 18 extends inwardly to receive and support a pole piece 20. The pole piece 20 is equipped with an encircling lip 22 for the purpose of capturing a magnet 24.

The magnet 24 is a permanent magnet of cylindrical construction. It fits snuggly within the skirt or lip 22 on the pole piece 20. It will be observed that the pole piece 20 freely slides over the end of the guide post 18. As the two parts are assembled, they capture therebetween a spring of flat construction which serves as a alignment spider. The spring is indicated by the numeral 26. The spider 26 is thus positioned or held between the guide post 18 and the pole piece 20. This fixes the spider 26 in location as will be described.

At the upper end of the structure, the numeral 28 identifies a top closure member. The top closure member 28 has a peripheral lip and is received against an upwardly facing shoulder 30. A seal member 32 is placed about the periphery of the closure member 28, and the outer lip 35 about the housing is bent or crimped over to capture the seal member 32. The seal member 32 is similar to the seal 16 in that both are formed of resilient materials.

The top closure member 28 is similar to the bottom closure member in diameter. However, it is different in that openings are formed in it to enable terminal posts 34 and 36 to be exposed for external connection. The terminal posts 34 and 36 preferably are similar to one another. The closure member 28 seals against the terminal posts 34 and 36 to prevent leakage from the housing. The terminal posts 34 and 36 provide electrical connections from the exterior to the interior of the geophone 10.

The closure member 28 includes an axially aligned guide post 38. The guide post 38 extends radially inwardly to a shoulder 40 which abuts a second pole piece 42. The pole piece 42 is similar to the pole piece 20 previously identified. The two pieces capture the magnet 24. The pole piece 42 fits against a second spider 44 which is captured against the shoulder 40 and is aligned by a centered axial pin 46.

The numeral 48 identifies a coil form which is received in an air gap between the magnet 24 and the surrounding case 12. The coil form 48 is concentrically positioned about the magnet 24. Clearance is provided so that it can move vertically without rubbing or dragging and to enable flow of the fluid. A clearance includes the space between the coil form 48 on the interior adjacent to the magnet 24 and on the exterior adjacent to the case 12. In the preferred embodiment of the present invention, the gap or spacing is in the range of about 0.020 inches or more. The coil form 48 supports a coil 50 which is connected by means of lead in wires (not shown) to the terminal posts 34 and 36. Some flexibility and slack is provided in the lead in wires to permit the coil form to move freely relative to the terminals 34 and 36. This prevents the lead in wires from constraining movement of the coil form.

The coil form 48 has a lower countersunk diameter identified at 52 and a similar countersunk diameter 54 at the upper end. The two countersunk portions terminate at shoulders which abut the centering spiders 26 and 44. They provide a flat face where the peripheral edge of the centering spiders can rest. As will be recalled, the spiders are captured upon assembly of the housing. The outer peripheries, however, engage the countersunk openings 52 and 54 to align the coil form 48. This arrangement centers the coil form with respect to the remainder of the apparatus. Moreover, it keeps the coil form aligned during excursions. The spiders are formed of arms connected between inner and outer rings. They exert only a minimal force axially but provide an adequate amount of force laterally against canting and therefore tend to maintain the coil form 48 in vertical alignment within the housing.

The numeral 56 identifies an upper encircling shoulder on the coil form 48. The shoulder 56 is interrupted at 58 where a notch or drilled opening is formed in the shoulder. An alignment pin 60 secured in the upper closure member 28 protrudes into the notch or opening 58. The alignment pin 60 prevents the coil form from rotating. Preferably, the pin 60 is received loosely within the notch or opening 58 so that the pin does not drag on the coil form during movement.

An inverted conical, helical spring 62 which is formed either of round wire or flat stock is located at the bottom. The conical spring 62 is centered about the upstanding guide post 18. It supports the coil form 48 by engaging the downwardly facing shoulder. The spring 62 serves as a linear force acting against the coil form 48 tending to return it to a quiescent or vertically centered position. Thus, when the coil form 48 moves upward, the spring 62 applies a linear force which, less the gravitational pull, tends to return the coil form to the neutral position. When it moves downwardly, the spring is compressed and applies a force greater than the gravitational pull and forces the coil form back to the vertically centered position. It is preferably linear in tension and compression. It preferably has a range of compression and elongation permitting the coil form to travel the full limit permit to its motion, without taking a permanent set or otherwise being damaged.

The spring coil 62 acts against the shoulder of the coil form 48 with a generally uniformly applied peripheral force to evenly return the coil form to its quiescent position. This force has a resultant force is axially located to maintain the coil form in alignment.

A suitable damping fluid is placed in the housing. The damping fluid has a viscosity in the preferred range of about one to twenty centistokes. One suitable damping fluid is 10 centistokes and one source of supply of this fluid is Dow Corning. Preferably, the entire case or housing is filled with damping fluid so that the coil form and all moving elements are fully submerged. Submergence of the coil form and moving elements is believed to be significant in that partial filling causes capillary action to occur adjacent to the coil form, creating unwanted forces which behave erratically.

Figure 2:
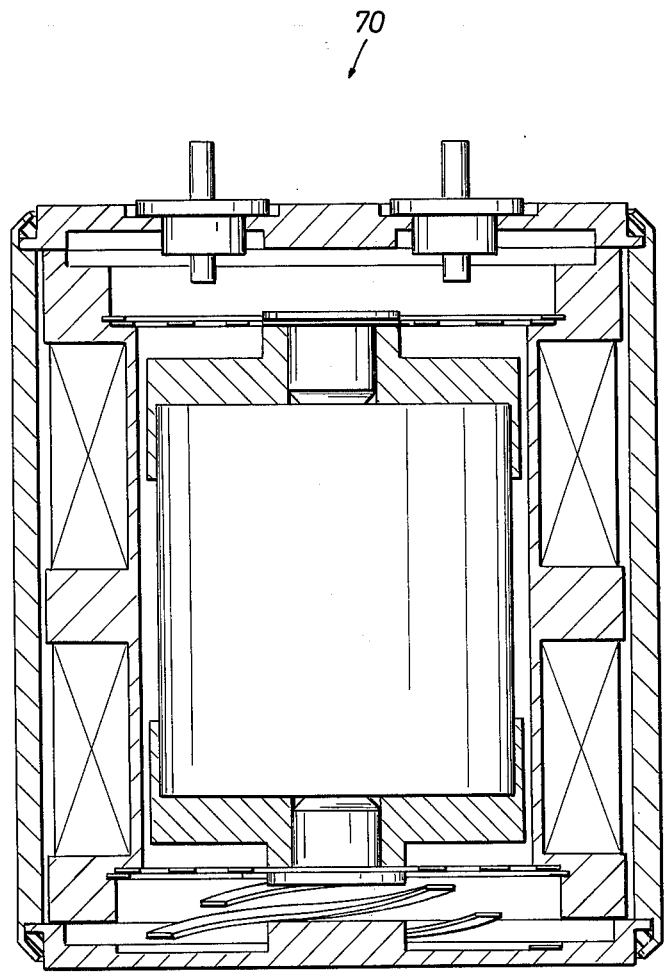

FIG. 2 discloses an alternative embodiment 70. It is similar in construction in most regards except that the coil is fixed and the magnet is movably mounted. The coil is locked in position against the shoulders at the top and bottom of the container. A stationary coil reduces the number of critical gaps by one. Indeed, since insulated or coated wire is normally used, the coil can be positioned much closer to the case or housing. The magnet is laterally centered by identical centering spiders which are fixed at their outer perimeter by a snap ring which holds them in position. The magnet is axially positioned by a spring identical to the spring 62 except the spring is inverted.

The embodiment 70 is fluid damped similarly to the embodiment 10. It achieves relative movement between the coil and magnet by moving the coil axially on the housing. Signals are formed on relative movement of the two components. The fluid damping of the moving part is similar to that of the embodiment 10.

The damped geophone of the present invention is particularly impervious to spurious resonance and parasitic oscillations. Spurious exitation is generally defined as that component of movement which is not axially aligned with the device. For instance, a laterally applied movement to the case or housing 12 would represent one example of spurious exitation. Moreover, fluid damping of this sort is effective without regard to the direction of spurious exitation. In the event of axial exitation, the damping fluid causes some power loss which compares quite favorably with the power losses encountered in critically damped geophones of the prior art. As a consequence, the device still is therefore able to form an output signal of useable magnitude. In further particular axial movement against the linear spring 62, the geophone provides a fidelity of output signals which compares quite favorably with devices known heretofore. Moreover, the absence of spurious signals from lateral exitation provides a fidelity of seismic reproduction which has not been achieved heretofore.

Geophones currently in use use springs for two purposes. One function is to provide a lift force along the axis of the geophone to offset gravitational pull on the inertia element. Another function is to center the coil form, or the inertia mass laterally and thus prevent lateral rubbing or drag. To achieve both purposes, it is necessary to sacrifice spring linearity since multiple arm geophones springs are ordinarily required. The use of multiple arms shortens the spring and therefore reduces the linear range. If only a single arm spring is used, it may have sufficient linear range but it will be deficient in preventing lateral movement.

In this invention, the two functions are separately assigned to separate springs. Two springs (26 and 44) have multiple arms to provide lateral centering and stability. The lift of springs 26 and 44 is negligible. The spring 62 is preferably a single arm spring, preferably of many turns, thereby having a greater length and hence greater linear range. The increased linear range enables the coil form to move linearly from top to bottom of the travel or excursion.

The fluid damped geophone has another advantage. The axial spring must overcome the gravitational pull. However, when the geophone is tipped, the gravitational force must be vectorially resolved into normal and axial components. The axial component decreases with the sine of the angle, approaching zero when the geophone is on its side. As it tips from the vertical, the force opposing the spring is reduced while the spring force along the axis remains unchanged and the spring moves the coil form toward the end of the excursion range. Thus, the moving mass (the coil) moves upwardly, away from the center position. In this position, geophone performance is seriously degraded, as by example, the introduction of harmonic distortion. If the moving coil tops out, the geophone is inoperative.

In the present invention, a bouyant force is created which partly offsets the gravitational force. This force is directed by gravitational pull so that tipping of the geophone does not seriously degrade performance. Stated differently, the spring force can be reduced and does not readily move the coil form to the upper limit of movement in comparison with other geophones.

When the present geophone is operated in a tilted position, the fluid damping applies a righting action to the coil form, tending to align the coil form for axial movement. This action, pulse the damping action on lateral movement, suppresses or eliminates parasitic oscillations and improves the linearity of the geophone. In use and operation, these features are very important, enabling use of the geophone where competitive devices would fail. The fluid damping action appears to be the difference between success and failure in geophone use in many circumstances.

The fluid chosen should be non-volatile over a specified temperature range and have a minimum coefficient of expansion with temperature. If desired, a gas under high pressure will have sufficient viscosity to serve in lieu of the liquid. However, liquid fluid is preferred in most applications.

Another feature ought to be pointed out in the present geophone, particularly in comparing it to the geophones of the prior art. Many geophones currently available use an inertia mass (coil form and coil thereon) which is small in comparison to the total unit weight. For example, the inertia element normally weighs in the range of about 10 to 15% of the complete geophone. This low ratio of the mass of the inertia element to total mass reduces the impedance match between the geophone and the earth during use. The ideal geophone would move in perfect unison with the earth with the inertia mass remaining stationary. If this occurs, the relative movement of the inertia mass (coil form and coil) and the magnet will duplicate the movement of the earth and the magnetically induced signal in the coil will duplicate a signal proportional to the earth's movement.

Geophones currently in use do not achieve the ideal results noted above. The low inertia mass ratio compounds the coupling problem between the geophone and the earth. The relatively heavy mass of the whole unit does not move in unison in less than ideal situations. The earth acts, in part in most geophone installations, as a compliance element at the point of installation. Relative motion is then achieved but with a loss of fidelity. In contrast, the present invention has a ratio of inertia mass to unit mass which is two or three times greater than that of other geophones. This reduces the coupling requirement between the earth and the geophone to a level which can be obtained in most circumstances. This geophone does not require perfect installation circumstances. The lower mass geophone, excluding the inertia mass, follows the earth's motion or movement with fidelity, and without compliance of the earth. The relative motion between coil and magnet duplicates the motion of the earth and a faithfully reproduced signal is formed.

Many variations and alterations of the device can be incorporated without departing from the scope. However, the scope of the present invention is determined by the claims which are appended hereto.

I claim:

1. In an electromagnetic geophone including a cylindrical casing, an annular coil-mass assembly in said casing, a cylindrical permanent magnet assembly in the bore of said coil-mass assembly, and a spring suspension system for resiliently mounting one of said assemblies for axial movement relative the other of said assemblies, said system comprising:
   a pair of horizontal spring spiders for coaxially maintaining one assembly relative to the other assembly, said horizontal spiders exerting negligible restoring forces in a vertical direction, and
   spring means elastically supporting for reciprocating axial movement the weight of said one assembly.

2. In an electromagnetic geophone responsive to mechanical vibrations and generating an electric signal, the geophone including a housing, a coil-mass assembly having an axial bore, a permanent-mass assembly concentrically mounted inside said bore, a spring suspension system for resiliently mounting one of said assemblies on the other assembly to reciprocally move in an axial direction, a pair of output terminals electrically connected to said coil-mass assembly to receive said electrical signal, said spring suspension system comprising:
   an upper horizontal spring spider engaging said one assembly for concentrically maintaining in non-weight supporting relationship the upper end of said one assembly relative to said other assembly,
   a bottom horizontal spring spider engaging the lower end of said one assembly for concentrically maintaining in non-weight supporting relationship the lower end of said one assembly relative to said other assembly, and
   a single helical spring for supporting substantially the entire mass of said one assembly and maintaining it in a desired axial position relative to said other assembly, said helical spring being adapted to linearly and reciprocally move in an axial direction when said housing becomes subjected to said mechanical vibrations.

3. The geophone of claim 2 wherein each spring spider includes a peripheral annular portion in engagement with said other assembly, a central annular portion in engagement with said one assembly, and a plurality of spider arms interlinking said peripheral and central annular portions.

4. The geophone of claim 3 wherein the physical size and spring characteristics of each spring spider are substantially identical whereby both spiders effectively produce matched horizontal restraining forces and negligible vertical restraining forces on said one assembly.

5. The geophone of claim 4 wherein said helical spring functions as a compression spring under static load of said one assembly.

6. The geophone of claim 5 wherein said helical spring has a conical configuration.

7. The geophone of claim 5 wherein said housing is substantially completely filled with a damping liquid.

8. The geophone of claim 7 wherein the mass ratio between said coil-mass assembly and said permanent magnet assembly is greater than 20 percent.

9. In a geophone comprising first and second relatively movable assemblies providing an output electric signal upon their relative motion, said first assembly being annular and said second assembly positioned in the bore of said first assembly, a spring suspension system resiliently suspending one of said assemblies for movement relative to the other in a direction generally parallel to the longitudinal axis of the bore in said first assembly, said spring system comprising:

a top and bottom spring spider, each spider having a central annular portion and an outer annular portion connected together by a plurality of spring arms, said outer and central portions being connected to the first and second assemblies, respectively, said spider springs suspending said one assembly for movement relative to the other in a direction generally perpendicular to said longitudinal axis, and linear spring means elastically suspending said one assembly for movement relative to the other in a direction generally parallel to said longitudinal axis.

10. The geophone of claim 9 wherein said arms and said annular portions of each spider being preformed to substantially lie in a single plane.

11. In an electromagnetic geophone comprising an annular coil-mass assembly, a permanent magnet assembly located in the bore of said coil-mass assembly, and a spring suspension system for supporting the coil-mass assembly for movement relative to the permanent magnetic assembly, in a direction parallel to the longitudinal axis of said bore, said system comprising:

two spring spiders extending transversely to said bore and spaced apart along the longitudinal axis, each spider having a central portion connected to the permanent magnet assembly, an outer portion connected to the coil-mass assembly, and a plurality of spring arms interconnecting said center and outer portions, said spring spiders having physical dimensions and spring characteristics such that they carry no appreciable portion of the weight of said coil-mass assembly, and spring means elastically supporting said coil-mass assembly for movement relative to said permanent magnet assembly in a direction generally parallel to said longitudinal axis.

12. The structure of claim 11 wherein said geophone is filled with a damping liquid.

13. The structure of claim 12 wherein said spring means is a helical spring.

14. The structure of claim 13 wherein said helical spring has an inverted conical configuration.

15. The structure of claim 13 wherein said helical spring has a conical configuration.

16. In an electromagnetic geophone including a housing comprising a cylindrical coil-mass assembly having a cylindrical bore therethrough, a permanent magnet assembly positioned in said bore and a spring suspension system for aligning and supporting the weight of the coil-mass assembly for movement relative to said permanent magnet assembly, said suspension comprising:

two substantially horizontal spring-spiders, and one helical vertical spring, said spiders extending transversely to said bore and being coupled to the opposite ends of said coil-mass assembly, each spider having a central portion and an outer portion connected together by a plurality of spring arms substantially lying in a horizontal plane for laterally aligning and concentrically maintaining said coil-mass assembly relative to the axis of said bore, and said vertical spring engaging the annular periphery of said coil-mass assembly thereby supporting substantially the entire weight of said coil-mass assembly and elastically maintaining the coil-mass assembly for reciprocal axial movement.

17. The geophone of claim 16 wherein said helical spring has a conical configuration.

18. The geophone of claim 17 wherein said housing is filled with a damping liquid.

* * * * *